Dec. 14, 1971   D. G. ROGERS   3,627,520

METHOD OF PRODUCING POROUS SINTERED TANTALUM

Filed Jan. 29, 1970

United States Patent Office 3,627,520
Patented Dec. 14, 1971

3,627,520
METHOD OF PRODUCING POROUS SINTERED TANTALUM
Donald G. Rogers, Pownal, Vt., assignor to Sprague Electric Company, North Adams, Mass.
Filed Jan. 29, 1970, Ser. No. 6,872
Int. Cl. B22f 7/00
U.S. Cl. 75—222                                    4 Claims

ABSTRACT OF THE DISCLOSURE

Porous sintered anodes suitable for use in electrolytic capacitors of the wet or solid type are produced by mixing a high percentage of an inorganic filler with a conventional tantalum powder and then heating the mixture so as to evaporate the inorganic filler and cause a sintering of the tantalum particles.

BACKGROUND OF THE INVENTION

This invention in general relates to a method of producing a low density tantalum anode capacitor and more particularly to a method for producing capacitors of the wet or solid type having porous sintered tantalum anodes with lower sintered densities than can be achieved by conventional pelleting and sintering techniques.

Powdered film-forming metal particles such as tantalum are used for making electrodes whereby the powdered metal is compressed into the desired shape and sintered to form a porous electrode member. It is the general practice to first compress the loose metal powder in a mold to form a so-called "green" ingot or compact of the shape of the mold. Subsequently after the compact is removed from the mold, it is subjected to temperatures sufficiently high to cause sintering of the particles, accompanied by an increase in density and a certain amount of shrinkage of the compact. The high densities of sintered anodes formed in the above described manner reduces the capacitance achievable for a given weight of metal. Also high density sintered anode capacitors have high dissipation factors thereby making them unsuitable for high frequency computer applications.

Therefore it is an object of this invention to form capacitors having increased capacitance values with decreased amounts of metal utilized for the anode.

It is a further object of this invention to form capacitors having low dissipation factors thereby being suitable for high frequency computer applications.

SUMMARY OF THE INVENTION

Porous sintered tantalum anodes having lower sintered densities than can be achieved by conventional pelleting and sintering techniques are produced in accordance with the method of this invention wherein a high percentage of an inorganic filler is mixed with a conventional tantalum powder and binder before sintering. The inorganic filler is selected so that it will not evaporate from the tantalum anode during sintering until a temperature has been attained at which some sintering of the tantalum occurs. The particles of the inorganic filler maintain the spacial relationship of the tantalum particles until sintering of the tantalum particles begins whereupon the inorganic filler starts to evaporate without substantially disturbing the spacing of the tantalum particles. The inorganic filler is completely evaporated leaving a porous sintered anode without any carbon residue as is normally the case when organic fillers are used. Anodes formed in accordance with the method of this invention may be used in both wet and solid type capacitors and are advantageously used in order to achieve lower dissipation factors and higher percentages of capacitance per given weight of tantalum.

DESCRIPTION OF THE PREFERRED EMBODIMENT

Figure 1:
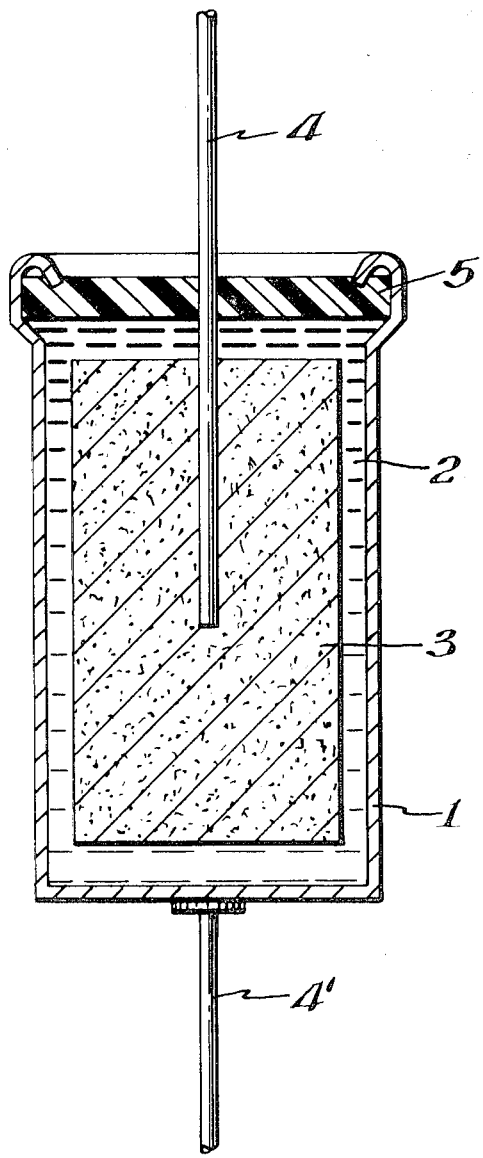
FIG. 1 shows a cross-sectional view of a wet electrolytic capacitor having a porous sintered anode.

Referring to the drawing of FIG. 1, there is shown an electrolytic capacitor comprising casing 1 serving as the cathode and containing a liquid such as glycol/borate, lithium chloride or sulfuric acid in which an anode 3 is immersed.

Casing 1 may be made of silver or any other metal which does not adversely affect the electrolyte or become corroded thereby. Anode 3 is made of a film-forming metal and while the preferred anode metal is tantalum, any other suitable film-forming metal such as niobium, titanium, or alloys of such metals with each other and other metals may be used. A lead wire 4 made of the same metal as anode 3 or other film-forming metal is embedded in the body of anode 3 and passes to the exterior of casing 1 through an insulating sealing plug 5 around which the upper end of casing 1 is crimped to provide a container for the capacitor. At the opposite end of the capacitor, a cathode lead 4' is suitably joined by welding or otherwise to the outside of casing 1. The surfaces of the metal forming the mass of anode 3 are provided with a thin anodic dielectric oxide film by subjecting anode 3 to an anodizing treatment, in accordance with processes well known in the electrolytic capacitor art. The anodic dielectric oxide which is not shown in the drawings is a film which coats all the surfaces throughout the porous metal mass.

Figure 2:
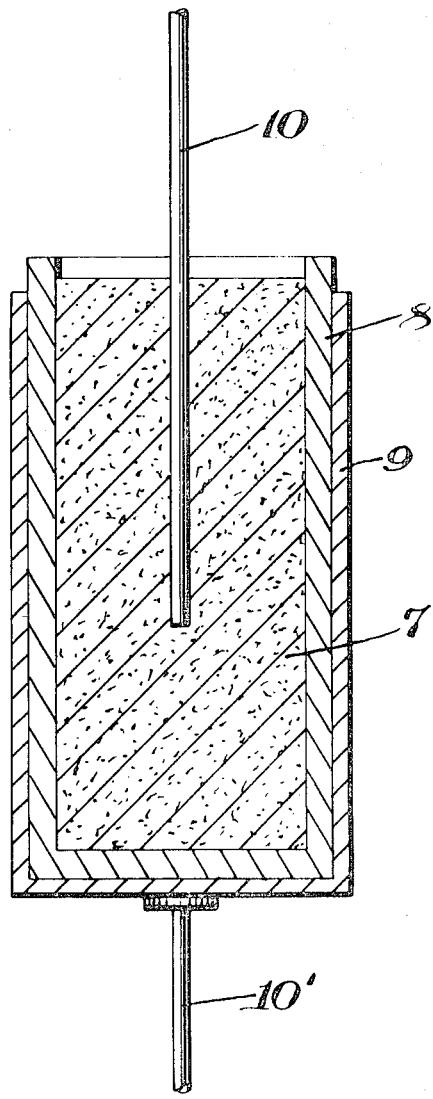
FIG. 2 shows a cross-sectional view of a dry electrolytic capacitor having a porous sintered anode.

Although the invention has been described relative to a wet electrolytic capacitor, the preferred embodiment of the present invention would be of the solid electrolyte type capacitor as shown in FIG. 2. The solid electrolyte capacitor comprises a porous anode 7 composed of a film-forming metal similar to anode 3 of FIG. 1, an anodic dielectric oxide film on the surfaces of the porous metal anode, a layer 8 of semiconductive material such as $MnO_2$, and an outer coating 9 of conductive material such as graphite serving as the counterelectrode or cathode. It is understood that both the wet and dry electrolytes of FIGS. 1 and 2 respectively overlie all the interior surfaces of porous metal anodes 3 and 7 as well as their exterior surfaces, without adversely affecting the density or porosity of the anode metal. Referring again to FIG. 2, lead wire 10 is embedded in anode 7 and cathode lead wire 10' is joined by suitable means at the other end of the capacitor unit to cathode layer 9.

In accordance with the method of the present invention, a high CV tantalum metal powder, prior to being pressed into the form of the unsintered or green ingot or compact, is uniformly mixed with a small percentage of binder and/or lubricant not to exceed 5% of the weight of the mixture and a high percentage of inorganic filler which would constitute from between 25% to 75% of the weight of the mixture. One of the characteristics of the filler is that it will not evaporate from the tantalum anode compact during sintering until a temperature has been attained at which some sintering of the tantalum occurs. The initial sintering temperature of tantalum is approximately 1000° C. and therefore suitable materials for use as the inorganic filler would evaporate in the 900–1500° C. temperature range and would completely volatilize at temperatures below 1700° C. Most of the halogens and compounds thereof such as calcium fluoride, sodium fluoride, magnesium fluoride and sodium chloride would be suitable for use as the inorganic filler. Many other compounds may be satisfactorily utilized for the filler and the following list of suitable materials is given only to illustrate the wide variety of groups and compounds from which the inorganic filler may be chosen and is meant in no way to be inclusive of all possible materials. The following compounds would be used for the inorganic filler: aluminum sulfide, copper sulfide, bismuth trioxide, copper oxide, silicon oxide, cadmium sulfate, potassium sulfate, potassium carbonate and sodium borate. A suitable organic binder and lubricant combination such as polyethylene glycol which is sold under the trade name "Carbowax" would be added to the powdered tantalum mixture.

The powdered mixture is next placed in a compacting die of the desired shape and pressed to densify the powder into a compact or blank for sintering. The compacting pressure is adjusted so as to compress the mixture to within the range of 50% to 80% of the theoretical density of the mixture. After the desired pressure has been applied to the powder, the compact is ejected from the mold. The compact is then placed in a furnace and heated in a protective atmosphere to cause sintering of the mass.

The sintering operation is accomplished in the manner well known to those skilled in the art and under conditions essentially the same as heretofore have been employed in sintering compacts pressed directly from the original powdered metal. Tantalum starts sintering at approximately 1000° C. and the temperature would increase to within a range of from 1700° C. to 1900° C. for between 15 and 30 minutes in order to achieve a complete sintering of the tantalum particles. The inorganic filler disposed uniformly throughout the powdered tantalum mixture maintains the spacing of the individual metal particles during sintering until a temperature at which some sintering of the tantalum occurs has been reached. The inorganic filler starts to evaporate when there has been a sufficient sintering of the tantalum particles so that the tantalum particles begin to bond to each other thereby maintaining their spacial relationship to each other without the support of the inorganic filler. The inorganic filler is completely evaporated from the mixture during sintering thereby leaving a porous tantalum anode.

The advantage of using an inorganic filler over an organic filler is that the inorganic filler may be completely evaporated without leaving a residue, whereas the organic filler leaves a carbon residue that tends to degrade the electrical properties of the anode. Also, organic fillers volatilize at temperatures below that at which sintering takes place resulting in collapse of the tantalum compacts. The particular temperature for the sintering operation is below the melting point of the metal involved and is related to the time required for the operation, the dimensions of the part being sintered, etc.

Experiments were conducted in which three lots of anodes were pressed from a mixture consisting of 45.7% tantalum powder and 54.3% sodium fluoride. Green compacts were compressed at the three following densities 2.84, 3.35 and 3.64 gm./cm.$^3$. After sintering, the densities were 3.16, 3.14 and 2.90 gm./cm.$^3$ respectively. Normally comparative anodes sintered under the same conditions without inorganic fillers have densities of approximately 8–9 gm./cm.$^3$. Capacitors formed with the porous anode structures of this invention in addition to low dissipation factors also have very high CXV/gram values. Values of 6,050, 5,850 and 6,200 mfd.×volt/gram respectively were attained for the three previously mentioned experimental lots whereas capacitors having anodes of the usual densities of 8 or 9 would have CXV/gram values of less than 5000 mfd.×volt/gram.

What is claimed is:

1. The method of producing a porous sintered tantalum metal body suitable for use as the anode of an electrolytic capacitor, which method comprises mixing tantalum metal particles and a powdered inorganic halogen compound filler which will not change state below the approximately 1000° C. temperature at which said tantalum particles begin to sinter and which will completely volatilize below the 1700° C. temperature required to complete sintering of said tantalum particles, uniformly dispersing a sufficient quantity of said filler throughout said tantalum particles so that said filler comprises from 25% to 75% of the weight of the mixture, compressing said mixture in a mold to form a compacted blank having a density of from 50% to 80% of the theoretical density of the mixture, and heating said compacted blank at a temperature and time sufficient to cause complete volatilization of said filler and complete sintering together of said tantalum particles.

2. The method of claim 1 wherein said mixture includes less than 5% by weight of organic binder and lubricant.

3. The method of claim 2 wherein said inorganic halogen compound filler is selected from the group consisting of calcium fluoride, sodium fluoride, magnesium fluoride, and sodium chloride.

4. The method of claim 3 wherein said inorganic filler is powdered sodium fluoride, said organic binder and lubricant combination is polyethylene glycol and said sintering occurs at temperatures in the range of 1700° C. to 1900° C. for between 15 and 30 minutes.

References Cited
UNITED STATES PATENTS

| | | | |
|---|---|---|---|
| 2,823,419 | 2/1958 | Winters et al. | 75—214 |
| 3,144,328 | 8/1964 | Doty | 75—222 |
| 3,323,914 | 6/1967 | Fincham | 75—222 |
| 3,445,625 | 5/1969 | Hetherington | 75—214 |
| 3,476,557 | 11/1969 | Fincham | 75—222 |

FOREIGN PATENTS

| | | | |
|---|---|---|---|
| 717,034 | 10/1954 | Great Britain | 75—222 |

REUBEN EPSTEIN, Primary Examiner